J. C. Terry,
Wrench.
No 2,966.    Patented Feb. 20, 1843.
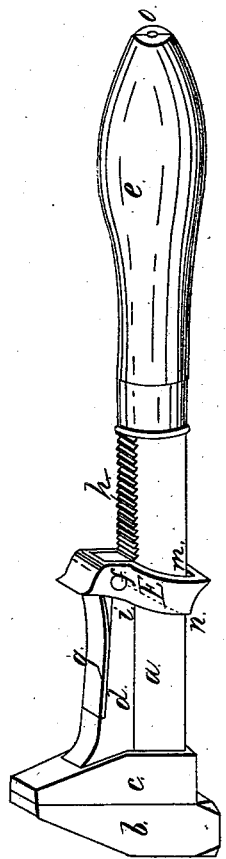

UNITED STATES PATENT OFFICE.

JABEZ C. TERRY, OF SPRINGFIELD, MASSACHUSETTS, ASSIGNOR TO SOLYMAN MERRICK.

RACK-WRENCH.

Specification of Letters Patent No. 2,966, dated February 20, 1843.

*To all whom it may concern:*

Be it known that I, JABEZ C. TERRY, of Springfield, in the county of Hampden and State of Massachusetts, have invented a new and useful Improvement on the Rack-Wrench; and I do hereby declare that the following is a full, clear, and exact description of the construction and operation of the same, reference being had to the annexed drawing, making a part of this specification, which is a perspective view of the wrench with my improvement, in which—

$a$ is the main bar of the wrench; $b$ the stationary jaw; $c$ the sliding jaw; $d$ the bar attached to the sliding jaw; $e$ the strap; $f$ the pivot; $g$ the spring; $h$ the rack upon the main bar; $i$ the rack on the end of the bar $d$; $l$ the handle of the wrench.

The nature of my invention consists in attaching a movable strap, by means of a pivot, to the end of the bar $d$, with the bearing underneath the main bar, a little forward of the pivot, so that when the bearing is drawn back as far as the pivot, there will be room to disengage the racks.

To enable others skilled in the art to make and use my invention, I will proceed to describe its construction and operation.

I make the main bar $a$ of iron or any other suitable material, at one end of which I make the stationary jaw $b$ which is attached to, and forms a part of the main bar. I fit the sliding jaw $c$ to move easily upon the part of the main bar between the stationary jaw and the handle. The bar $d$ which is attached to the jaw $c$ and forms a part of it, I make of a convenient length, and from the end of which, extending toward the jaw, I make a short rack to correspond with the rack $h$, two teeth of which are shown at $i$; this rack when engaged with the rack $h$ is held in its place by the strap $e$ which passes around the main bar and is attached to the bar $d$ by the pivot $f$; the bearing of this strap upon the under side of the main bar, is at $n$, and its direction from the pivot is shown by the dotted line; the back of the strap is left open underneath as shown at $m$ to allow the bearing of the strap to be drawn back as far as the pivot. The strap $e$ is held in its place by the spring $g$, one end of which is riveted to the bar $d$ and the other takes into an opening in the upper part of the strap $e$. The rack $h$ I make upon the upper edge, or side of the main bar, and of a length sufficient for the jaws of the wrench to open, in addition to the length of the rack $i$. From the rack $h$ I make the main bar of suitable size and proportion, and of sufficient length to pass through the handle $l$, which handle is driven firmly on and held in its place by a screw and nut as shown at $o$.

From the foregoing arrangement it will be seen that by drawing the lower part of the strap $e$ toward the handle until the dotted line shall be at a right angle with the main bar, space will be allowed to disengage the rack $i$ from the rack $h$; the slide jaw will then be at liberty to move upon the main bar, and when set to any desired point, the strap $e$ will be forced back to its original position by the spring $g$, in which position it will hold the racks firmly together until another change of the slide jaw is desired.

What I claim as my invention and desire to secure by Letters Patent, is—

The combination of the strap $e$ and the spring $g$, with the bar of the sliding jaw and the main bar, the two bars being notched as described.

JABEZ C. TERRY.

Witnesses:
A. G. JANNETT,
JUSTIN WILLARD.